United States Patent
Vautin et al.

(10) Patent No.: US 9,352,701 B2
(45) Date of Patent: May 31, 2016

(54) MANAGING TELEPHONY AND ENTERTAINMENT AUDIO IN A VEHICLE AUDIO PLATFORM

(71) Applicant: Bose Corporation, Framingham, MA (US)

(72) Inventors: Jeffery R. Vautin, Worcester, MA (US); Eduardo T. Salvador, Cambridge, MA (US); Ryo Maiguma, Tokyo (JP); Tobe Z. Barksdale, Bolton, MA (US); Douglas J. Holmi, Marlborough, MA (US); Charles Oswald, Arlington, MA (US); Shiufun Cheung, Lexington, MA (US); Michael S. Dublin, Arlington, MA (US); Zukui Song, Wellesley, MA (US)

(73) Assignee: Bose Corporation, Framingham, MA (US)

( * ) Notice: Subject to any disclaimer, the term of this patent is extended or adjusted under 35 U.S.C. 154(b) by 89 days.

(21) Appl. No.: 14/199,799

(22) Filed: Mar. 6, 2014

(65) Prior Publication Data
US 2015/0256933 A1 Sep. 10, 2015

(51) Int. Cl.
*H04B 1/00* (2006.01)
*B60R 11/02* (2006.01)
*H04R 3/12* (2006.01)
(Continued)

(52) U.S. Cl.
CPC ........... *B60R 11/0217* (2013.01); *G10L 15/265* (2013.01); *H04B 3/20* (2013.01); *H04M 1/6083* (2013.01); *H04M 9/082* (2013.01); *H04R 3/12* (2013.01); *G10L 2021/02082* (2013.01); *H04R 2420/01* (2013.01); *H04R 2430/01* (2013.01); *H04R 2499/13* (2013.01)

(58) Field of Classification Search
CPC ............ H04R 5/02; H04R 3/005; H04R 3/12; H04R 2430/01; H04R 2499/13; H04R 1/1091; B60R 11/217; H04B 3/20; H04M 9/082
USPC ..................................................... 381/86, 302
See application file for complete search history.

(56) References Cited

U.S. PATENT DOCUMENTS

| 7,424,127 | B1 | 9/2008 | Holmi et al. |
| 8,190,438 | B1 * | 5/2012 | Nelissen ................. G10L 21/00 381/85 |

(Continued)

FOREIGN PATENT DOCUMENTS

| EP | 2611213 A1 | 7/2013 |
| JP | 07154890 A | 6/1995 |

(Continued)

OTHER PUBLICATIONS

International Search Report and Written Opinion for Application No. PCT/US2015/018276, mailed Jun. 5, 2015, 13 pages.

*Primary Examiner* — Vivian Chin
*Assistant Examiner* — Ammar Hamid
(74) *Attorney, Agent, or Firm* — Toler Law Group, PC

(57) ABSTRACT

A signal input module receives at least one of an entertainment audio signal and a telephony audio signal from vehicle sound circuitry. A level control module executes gain level control logic to balance the entertainment audio signal and a telephony audio signal according to a ratio. A gain control signal is applied to at least one of the entertainment audio signal and the telephony audio signal. A routing module mixes the entertainment audio signal and the telephony audio signal and routes the mixed signal to an output channel associated with a speaker.

20 Claims, 4 Drawing Sheets

(51) Int. Cl.
- *H04M 9/08* (2006.01)
- *H04B 3/20* (2006.01)
- *G10L 15/26* (2006.01)
- *H04M 1/60* (2006.01)
- H04R 5/02 (2006.01)
- G10L 21/0208 (2013.01)

(56) References Cited

U.S. PATENT DOCUMENTS 8,892,046 B2 * 11/2014 Hera .................. H04M 1/6083
340/988

| | | |
|---|---|---|
| 2006/0262935 A1 | 11/2006 | Goose et al. |
| 2008/0273712 A1 * | 11/2008 | Eichfeld ................ H04S 7/302 381/86 |
| 2008/0273714 A1 | 11/2008 | Hartung |
| 2008/0273722 A1 | 11/2008 | Aylward et al. |
| 2010/0041443 A1 | 2/2010 | Yokota |
| 2012/0230534 A1 | 9/2012 | Pan et al. |

FOREIGN PATENT DOCUMENTS

| | | |
|---|---|---|
| JP | 2006080886 A | 3/2006 |
| WO | 2008051722 A2 | 5/2008 |

* cited by examiner

MANAGING TELEPHONY AND ENTERTAINMENT AUDIO IN A VEHICLE AUDIO PLATFORM

I. FIELD

The present disclosure is generally related to vehicle sound systems, and more particularly, to vehicular sound systems supporting telephony audio.

II. BACKGROUND

Automobile speakers provide music and other entertainment audio to occupants of a vehicle. The same speakers can be wired to provide telephony audio to the driver engaged in a telephone conversation. During the conversation, the entertainment audio is superseded by telephony audio to accommodate the telephone conversation. Consequently, the passengers listening experience is interrupted in deference to the telephone call. Moreover, the private conversation of the driver is broadcast to all of the passengers in the vehicle.

III. SUMMARY

In one aspect, an apparatus includes a signal input module to receive at least one of an entertainment audio signal and a telephony audio signal from vehicle sound circuitry. A level control module executes gain level control logic to balance the entertainment audio signal and a telephony audio signal according to a ratio. A gain control signal is applied to at least one of the entertainment audio signal and the telephony audio signal. A routing module mixes the entertainment audio signal and the telephony audio signal and routes the mixed signal to an output channel associated with a speaker.

The level control module determines the ratio using inputs that include the entertainment audio signal, the telephony audio signal, an upmixed entertainment audio signal, and an upmixed telephony audio signal. An upmixing module is configured to upmix at least one of the entertainment audio signal and the telephony audio signal. The signal input module further receives a speech signal originating from a vehicle occupant. An adaptive filter removes unwanted entertainment audio from a speech signal originating from a vehicle occupant. An adaptive filter provides echo cancellation. The speakers include a headrest speaker. The level control module determines a weighted average of the entertainment audio signal and an upmixed entertainment audio signal to generate an entertainment reference signal. The level control module determines a weighted average of the telephony audio signal and an upmixed telephony audio signal to generate a telephony reference signal. A speech detector module updates the telephony reference signal in response to detecting a speech signal originating from a vehicle occupant. The level control module applies frequency weighting to at least one of an entertainment reference signal and a telephony reference signal to generate the gain control signal. The routing module combines the entertainment audio signal and a telephony audio signal.

In another particular implementation, an apparatus includes a memory storing gain level control logic and a controller configured to access the memory and to execute the gain level control logic to balance an entertainment audio signal and a telephony audio signal according to a ratio. The controller is further configured to apply a gain control signal to at least one of the entertainment audio signal and the telephony audio signal.

The controller initiates mixing the entertainment audio signal and the telephony audio signal and routing the mixed signal to an output channel associated with a headrest speaker. The controller determines the ratio using inputs that include the entertainment audio signal, the telephony audio signal, an upmixed entertainment audio signal, and an upmixed telephony audio signal. The controller determines a weighted average of the entertainment audio signal and an upmixed entertainment audio signal to generate an entertainment reference signal. The controller determines a weighted average of the telephony audio signal and an upmixed telephony audio signal to generate a telephony reference signal.

In another particular implementation, a method of audio management includes receiving an entertainment audio signal and a telephony audio signal. A gain control signal is generated using a gain level control algorithm configured to balance the entertainment audio signal and a telephony audio signal according to a ratio. The gain control signal is applied to at least one of the entertainment audio signal and the telephony audio signal. The entertainment audio signal is mixed with the telephony audio signal and the combined signal is routed to an output channel.

The output channel may be routed to a headrest speaker. The ratio may be determined using inputs that include the entertainment audio signal, the telephony audio signal, an upmixed entertainment audio signal, and an upmixed telephony audio signal.

The listening experience of all vehicle occupants is improved by intelligibly reducing audio leakage between the telephony and entertainment audio signals. An acoustic configuration leverages headrest speaker hardware to provide a clearer telephone experience. At the same time, passengers not involved in a telephone call enjoy the entertainment audio without undesirable audio leakage from the telephone call.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 3:
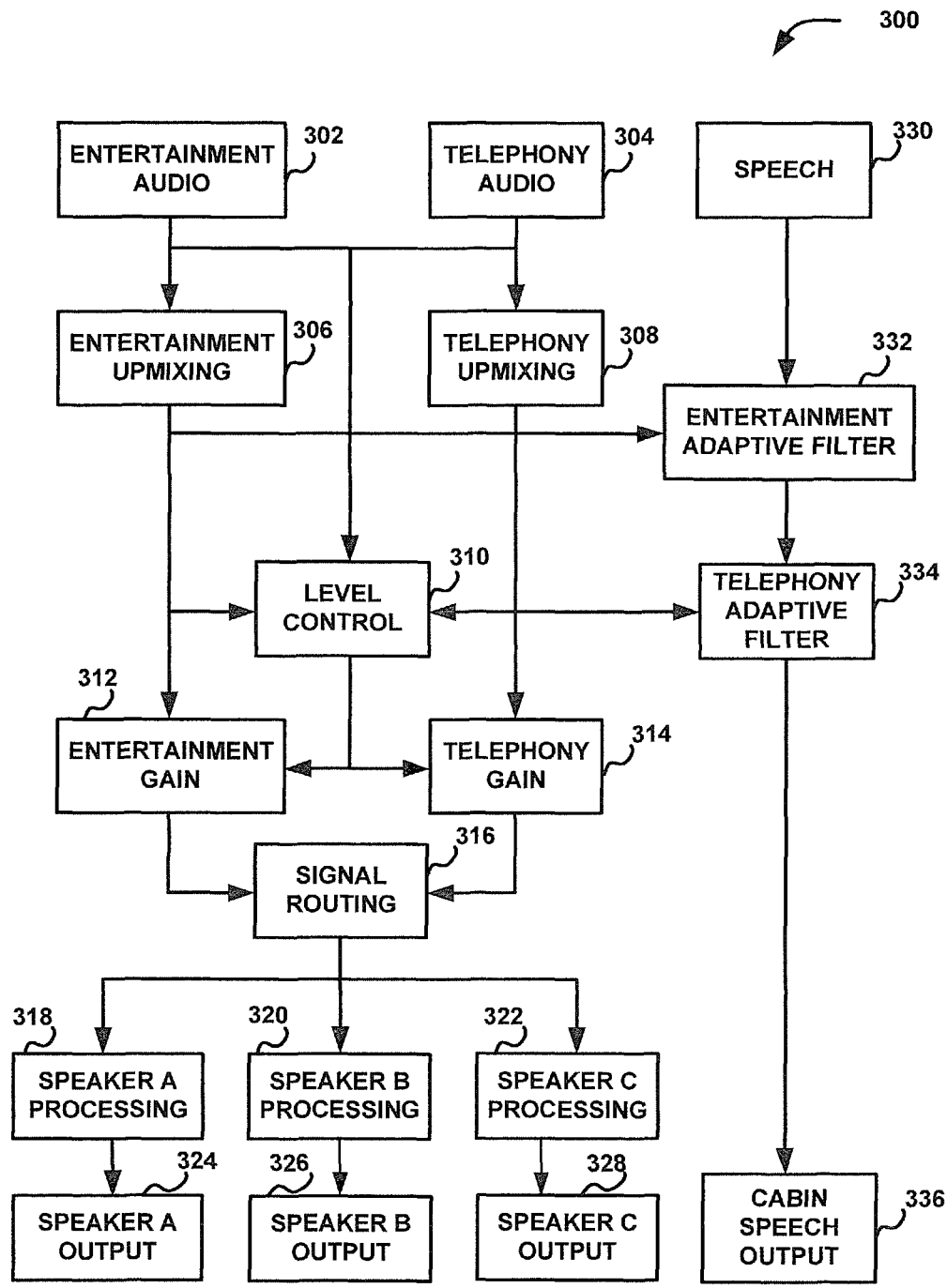
Figure 4:
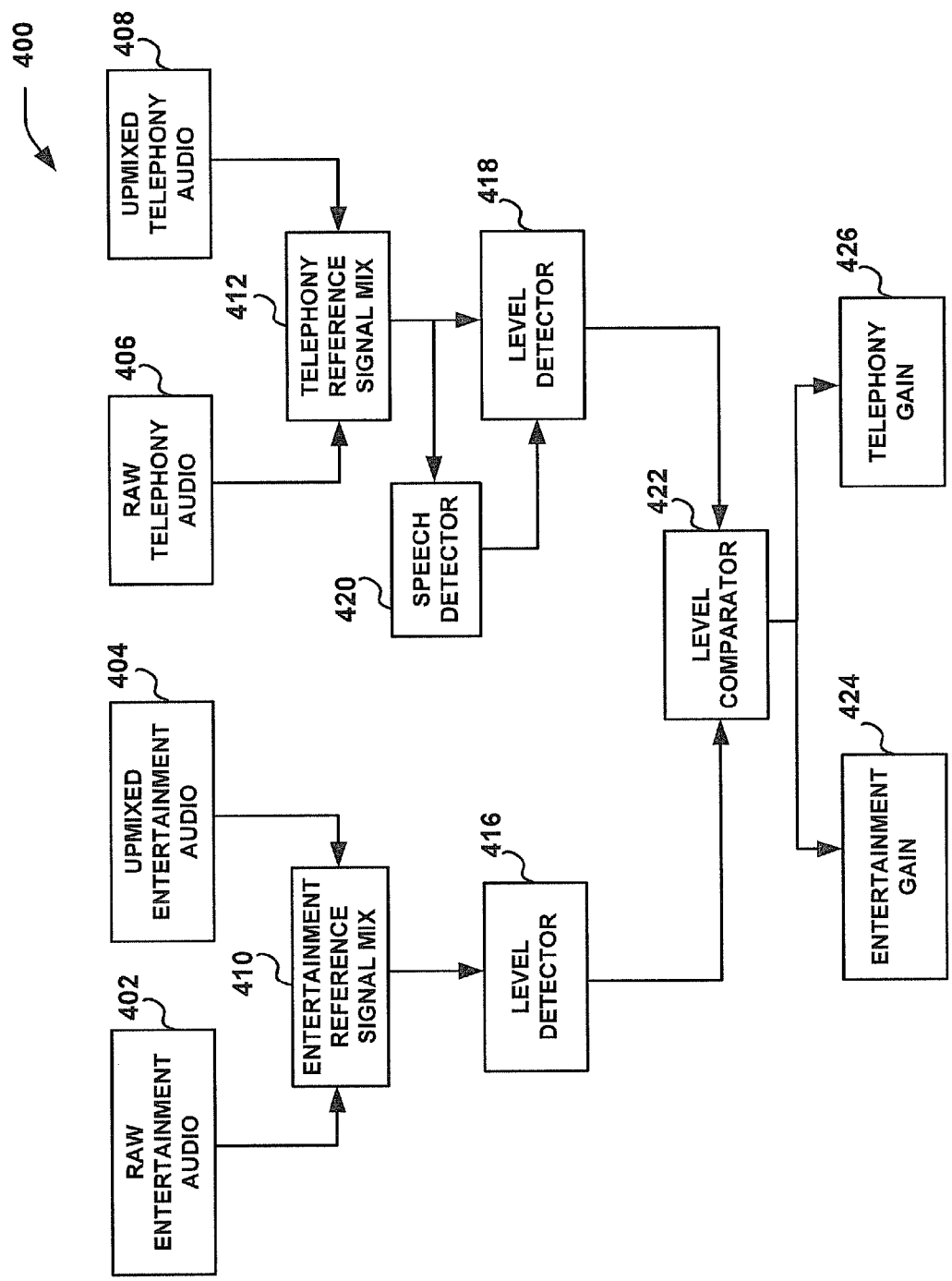

FIG. 3 is a flow diagram illustrating components and processing flow of a vehicle audio reproduction system configured to concurrently play back telephony speech and entertainment audio using a microphone and an adaptive filter signal processing path; and FIG. 4 is a flow diagram illustrating components and processes associated with a gain level control algorithm that balances entertainment audio and telephony audio such that both are selectively audible and intelligible.

V. DETAILED DESCRIPTION

This document relates generally to an in-cabin reproduction system that concurrently plays back telephony speech and entertainment audio. An acoustic configuration leverages headrest speaker hardware to provide a clearer telephone experience. At the same time, passengers not involved in a telephone call enjoy the entertainment audio without undesirable audio leakage from the telephone call. To this end, a level algorithm controls aspects of both the telephony and the entertainment audio so that the driver experiences primarily coherent speech, while others experience primarily entertainment audio at a premium level.

The needs of a driver having a telephone conversation are balanced with those of passengers listening to entertainment audio by generating respective signal gains according to the gain level control algorithm. The level algorithm controls the relative levels of both the entertainment and the telephony audio to avoid the driver losing speech under a loud passage of music. Likewise, the relative levels are controlled to minimize leakage from the telephone call to the passengers not participating on the call. An example of a desired level of audio performance includes some level of audio bleed between the experience of the telephone participant and the other passengers. Another example includes zero audio bleed between the telephone participant and the passenger experiences.

Headrest arrays are used in combination with fixed speakers elsewhere in the cabin to manage audio for both a driver and passengers during a telephone call. The telephony audio is confined to either or both of the driver and passenger(s), while the system continues to provide entertainment audio to those who are not participating in the call. The entertainment audio is provided in a manner that does not distract the call participant or degrade the signal-to-noise ratio of a voice microphone. In one example, front speakers are exclusively used. The speakers are forward facing. However, another configuration includes upward oriented speakers. Seat-to-seat communication is provided with privacy or at least without distracting passengers in other seats. The system improves the listening experience of all present in the vehicle by intelligibly reducing audio leakage between the telephony and entertainment audio signals.

Entertainment audio undergoes audio processing and is routed to speakers, including headrest speakers. Telephony audio is routed through processing to control spatial presentation. Generally, the acoustic system receives entertainment and the telephony audio signals. Level control information (e.g., gain level) is provided, and gain is applied to the entertainment and the telephony audio signals to balance and otherwise manage a relationship between them. The balanced audio signals are routed to speakers.

A gain level control algorithm takes in raw and upmixed entertainment and the telephony audio signals. The gain level control algorithm performs a comparison operation of the entertainment and the telephony audio levels and generates gain values. The gain levels are used to determine the gain to apply to the entertainment and the telephony audio signals. The gain levels are used to apply gain to produce scaled audio signals. The gain values are fed to gain control modules to scale the entertainment and the telephony audio signals relative to each other. Nonlinear compression algorithms may be used to keep gain levels in check and at a determined ratio.

In one example, a linear entertainment audio signal is used as a reference for determining level control values and for scaling the gain. Alternatively, all various nonlinear outputs of the entertainment audio of a vehicle may be used to determine the gain values. Both raw and processed entertainment audio are used as inputs to the gain level control algorithm. Similarly, both raw and processed telephony audio are fed into the level control algorithm.

Applied gain varies according to the processed entertainment audio outputs. For instance, gain applied to a broken out surround sound component is lighter than a gain level applied to a center component of a processed entertainment audio signal. In such an example, the gain level control application is nonlinear and time-varying.

One or more microphones in the vehicle cabin link to audio processing to pick up speech and reject unwanted entertainment audio. A microphone signal is processed through an adaptive filter. The filter adapts in such a manner as to cancel entertainment audio, as well as other unwanted audio in the vehicle cabin. Multiple microphones and associated signals are used to provide a more directional microphone pickup pattern to assist with the rejection of the entertainment audio. Potential microphone positions include the headliner and headrests of the vehicle.

Entertainment audio includes a raw unprocessed audio signal originating from a vehicle entertainment player. The entertainment audio is passed to an amplifier for acoustic balancing and other processing. The entertainment processing module performs spectral adjustments. The entertainment processing module manages spatial changes based on nonlinear signal processing. In one example, limiters are included to protect speakers. A level control module includes an algorithm configured to determine gains to apply to each output signal so that the presentation of the two sources is acceptable. The gain modules receive the gain signals from the level control module and map the gain routed to each speaker. A routing module routes each signal to an appropriate loudspeaker.

Figure 1:
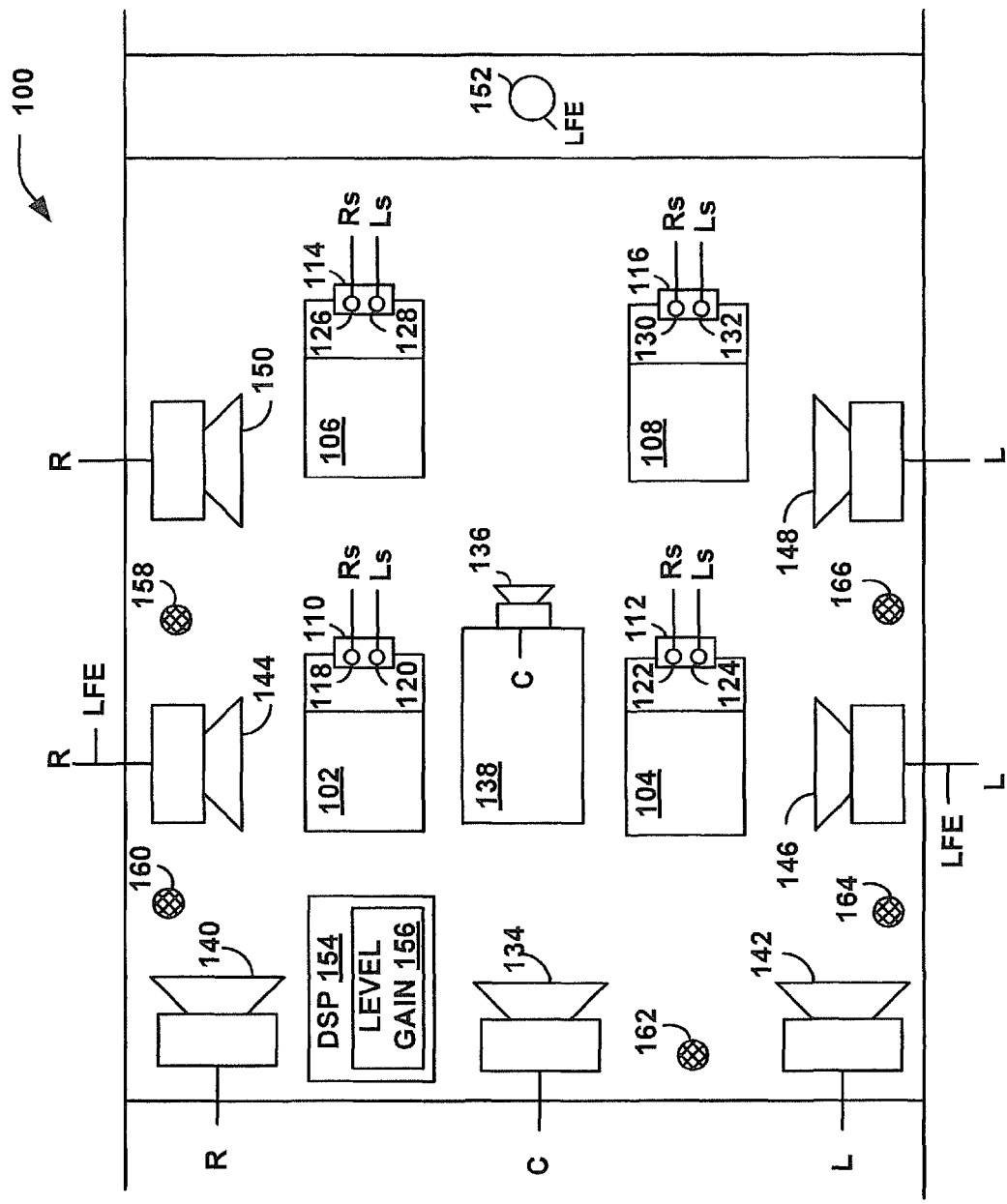
FIG. 1 is a top diagrammatic view of an automobile passenger compartment having an audio system configured to concurrently play back telephony speech and entertainment audio.

FIG. 1 is a top diagrammatic view of an automobile passenger compartment 100 having an audio system configured to concurrently play back telephony speech and entertainment audio. The passenger compartment 100 includes four car seats 102, 104, 106, 108 having headrests 110, 112, 114, 116 in which speakers 118, 120, 122, 124, 126, 128, 130, 132 are mounted. In one implementation, surround sound channels are radiated by speakers positioned about the passenger compartment. For example, a center channel (C) is radiated by a first speaker 134 positioned in a dashboard and by a second speaker 136 positioned proximate a rear of a center console 138. The center console 138 is positioned between the front seats 102, 104.

The second speaker 136 is oriented such that it radiates sound predominantly toward the rear of the passenger compartment 100. High frequency (e.g., above approximately 150 Hz) portions of left (L) and right (R) channels are radiated by third and fourth speakers 140, 142. The third and fourth speakers 140, 142 are positioned on the left and on the right of the dashboard, respectively. Low frequency (e.g., below approximately 150 Hz) portions of the left and right channels are radiated by fifth and sixth speakers 144, 146, respectively. The fifth and sixth speakers 144, 146 are positioned in the left front door and right front door, respectively, forward of the front seats 102, 104. Left and right channel spectral components (e.g., above approximately 100 Hz) are radiated by seventh and eighth speakers 148, 150, respectively. The seventh and eighth speakers 148, 150 are positioned in a left rear door and right rear door, respectively, forward of the rear seats 106, 108.

A bass channel that includes the low frequency effects (LFE) is radiated by a ninth speaker 152 positioned behind the two rear seats 106, 108 in a package shelf of the passenger compartment 100, as well as by the third and the fourth speakers 140, 142. Left surround channel (LS) is radiated by the four speakers 120, 124, 128, 132 in the headrests 110, 112, 114, 116 of the four seats 102, 104, 106, 108. Right surround channel (RS) is radiated by the four speakers 118, 122, 126, 130 in the headrests 110, 112, 114, 116.

An array of microphones 158, 160, 162, 164, 166 is positioned in the headrests and dashboard of the passenger compartment 100 to pick up speech by a driver or passenger. A digital signal processor (DSP) 154, or controller, of an amplifier platform accesses memory to execute a stored level gain algorithm 156. The level gain algorithm 156 is configured to concurrently play back and control relative levels of both telephony speech and entertainment audio. The DSP 154 generates a gain that is applied to entertainment and telephony audio signals to balance and otherwise manage audio for both a driver and passengers during a telephone call. The balanced audio signals are routed to the speakers 118, 120, 122, 124, 126, 128, 130, 132, 134, 136, 140, 142, 144, 146, 148, 150, 152.

Figure 2:
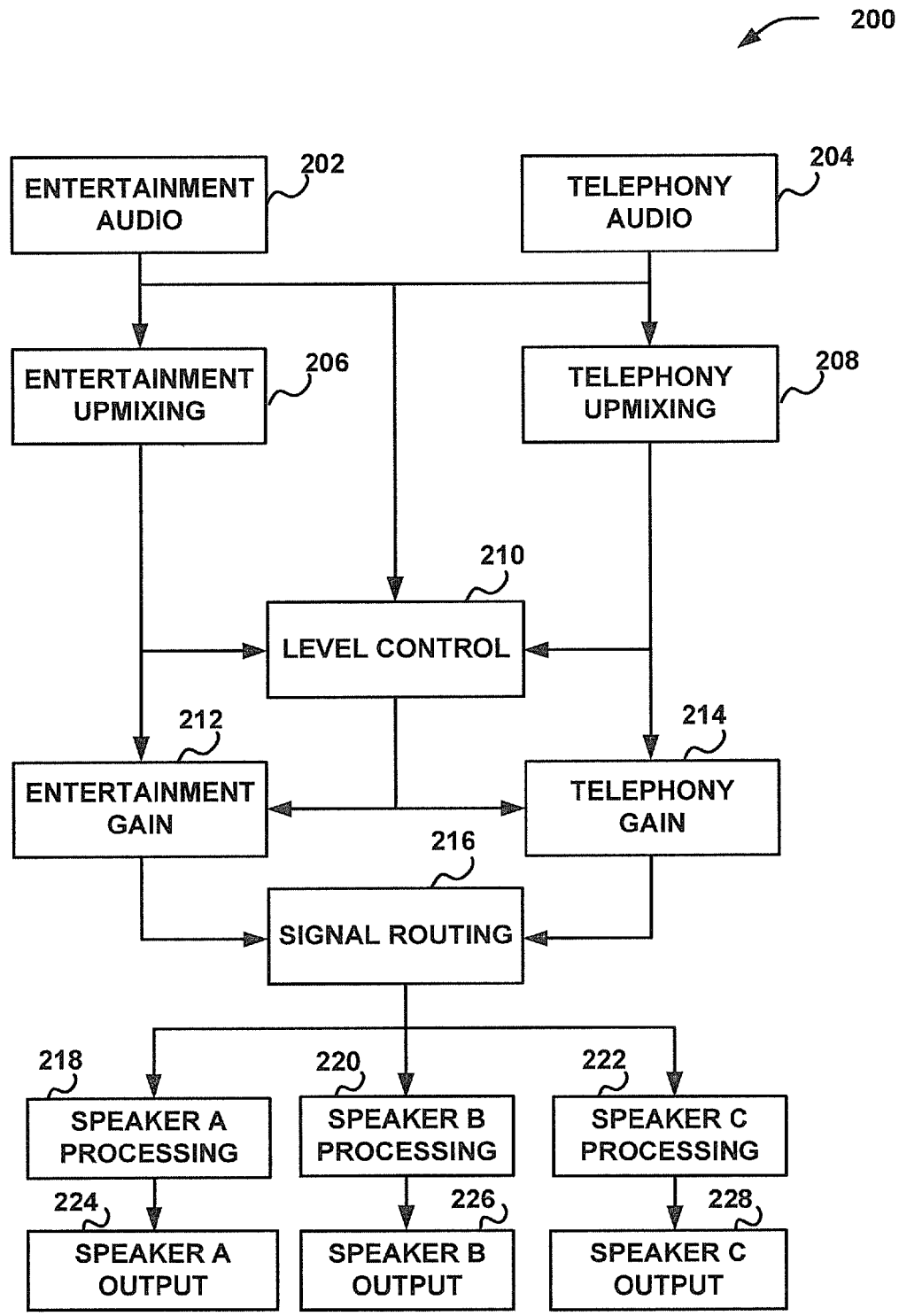
FIG. 2 is a flow diagram illustrating components and processing flow of a vehicle audio reproduction system configured to concurrently play back telephony speech and entertainment audio.

FIG. 2 is a flow diagram 200 illustrating components and processing flow of a vehicle audio reproduction system configured to concurrently play back telephony speech and entertainment audio. Raw entertainment audio 202 and raw telephony audio 204 are provided by a vehicle. More particularly, the entertainment audio 202 includes a raw unprocessed audio signal originating from a vehicle entertainment player, and the telephony signal 204 is a raw unprocessed signal from the telephone communication component of the vehicle. The entertainment audio 202 and raw telephony audio 204 are received by a DSP of an amplifier platform. For instance, the entertainment audio 202 and raw telephony audio 204 are received by a DSP 154, such as in the system 100 of FIG. 1.

The entertainment audio 202 undergoes upmixing at an entertainment upmixing module 206, and raw telephony audio 204 undergoes upmixing at a telephony upmixing module 208. The upmixing separates the stereo components of the raw entertainment audio 202 and the raw telephony audio 204 into a number of signals that are eventually steered to various speakers to control spatial presentation. Put another way, upmixing creates unique audio signals for each speaker. The entertainment upmixing module 206 and the telephony upmixing module 208 further makes determinations as to which speakers the upmixed audio signals will be routed.

A level control module 210 receives at least one of the raw entertainment audio 202, raw telephony audio 204, and outputs from the entertainment upmixing module 206 and the telephony upmixing module 208. The level control module 210 balances entertainment audio and telephony audio in such a manner as that both the telephony and entertainment audio are audible and intelligible, as well as selectively presented to appropriate recipients. The level control module 210 includes an algorithm configured to determine gains to apply to each output signal so that the presentation of the two sources is acceptable. An acceptable presentation includes a predetermined ratio of gain levels that satisfies a Speech Transmission Index (STI) parameter. In one scenario, the ratio is set such that driver still aware of audio, and passenger can hear some level of telephony Where multiple inputs into the level control module 210 are included, nonlinear upmixing processes are factored in to balancing audio playback signals. The level control module 210 produces gain control signals 212, 214 that are applied to the upmixed signals outputs. Thus, the gain control signals 212, 214 apply gain according to the level control module 210. The gain control signals 212, 214 are used to provide a balance of the telephony and entertainment audio signals relative to each other.

The upmixed and balanced telephony and entertainment audio signals are summed together at the signal routing module 216. The summed outputs are routed to output channel processing. The signal routing module 216 is configured to receive and sum entertainment audio and telephony audio that is destined for a particular speaker. The summed signals are passed along to speaker processing 218, 220, 222 designed specifically for that speaker. That is, the signal routing module 216 mixes signals together and routes them to appropriate output channels. The routing process is repeated for each speaker output 224, 226, 228. Speaker output processes includes equalization, as well as and nonlinear elements, including limiting processing to protect speaker. The controller transmits the out processed signals to the amplifier microchips that drive the speakers.

FIG. 3 is a flow diagram 300 illustrating components and processing flow of a vehicle audio reproduction system configured to concurrently play back telephony speech and entertainment audio. The flow diagram 300 of FIG. 3 is similar to the flow diagram 200 of FIG. 2, and adds a microphone and an adaptive filter signal processing path. As shown in FIG. 3, the adaptive filter signal processing path includes blocks 330, 332, 334, and 336. One or more cabin microphones pick up speech 330 from a speaker in the vehicle. An entertainment adaptive filter module 332 is configured to remove entertainment audio from voice signals transmitted to telephony adaptive filter module 334. The telephony adaptive filter module 334 is configured to provide echo cancellation. The echo cancellation reduces instances where a speaker hears their own voice echoed back at them. In this manner, both filter modules 332, 334 scrub unwanted signals from detected speech.

Turning more particularly to the flow diagram 300, raw entertainment audio 302 and raw telephony audio 304 are received by a DSP at an input module of an amplifier platform. The entertainment audio 202 and the raw telephony audio 204 undergo upmixing at an entertainment upmixing module 306 and a telephony upmixing module 308, respectively. An output from the entertainment upmixing module 306 is received at the entertainment adaptive filter module 332. The telephony upmixing module 308 is received at the telephony adaptive filter module 334. Scrubbed outputs from the entertainment upmixing module 306 and the telephony upmixing module 308 are provided as cabin speech output 336.

A level control module 310 receives at least one of the raw entertainment audio 302, raw telephony audio 304, and outputs from the entertainment upmixing module 306 and a telephony upmixing module 308. A gain control module of the level control module 210 produces gain control signals 312, 314 that are used to apply gain onto upmixed signals outputs. The gain control signals 312, 314 are used to provide a balance of the telephony and entertainment audio signals relative to each other.

The upmixed and balanced telephony and entertainment audio signals are summed together at the signal routing module 316. The summed outputs are routed to output channel processing. The signal routing module 316 receives and sums the entertainment audio and telephony audio and passes it along to speaker processing 318, 320, 322 designed specifically for that speaker. The routing process is repeated for each speaker output 324, 326, 328. The controller transmits the out processed signals to the amplifier microchips that drive the speakers. Outputs from the entertainment upmixing module 306 and the telephony upmixing module 308 are relayed as cellular phone for transmission.

While the audio system works with a single cabin microphone, an array of multiple microphones provides a more directional pickup. Acoustics of the array are used to reject unwanted entertainment audio and echo from the telephony audio, even before hitting the adaptive filter.

FIG. 4 is a flow diagram 400 illustrating components and processes associated with the gain level control algorithm. The gain level control algorithm is executed by the controller at the level control module of FIGS. 2 and 3. The level control module balances entertainment audio and telephony audio such that both are selectively audible and intelligible. As shown in FIG. 4, the gain level control algorithm receives four inputs. The four inputs include the raw entertainment audio 402, the upmixed entertainment audio 404, the raw telephony audio 406, and the upmixed telephony audio 408.

The raw entertainment audio 402 and the upmixed entertainment audio 404 are received at an entertainment reference signal mix module 410. The entertainment reference signal mix module 410 determines a weighted average of the raw entertainment audio 402 and the upmixed entertainment audio 404 to produce an entertainment reference signal. In parallel, the raw telephony audio 406 and the upmixed telephony audio 408 are received at a telephony signal mix module 412. The telephony signal mix module 414 determines a weighted average of the raw telephony audio 406 and the upmixed telephony audio 408 to produce a telephony reference signal.

First and second level detectors 416, 418 detect levels of the entertainment reference signal and the telephony reference signal, respectively, to be used as estimated values. More particularly, the first level detector 416 outputs an estimated level of the entertainment reference signal. The second level detector 418 outputs an estimated level of the telephony reference signal.

A speech detector module 420 updates an estimate of the telephony reference signal. The speech detector module 420 only sends an updating signal when speech is present so as to not overcompensate when person on a far end of phone call is not speaking.

Outputs of the level detectors 416, 418, including estimated levels of the entertainment reference signal and of the telephony reference signal, are received at a level comparator 422. The level comparator 422 generates gain control signals that maintain a minimum level ratio and that are frequency weighted between entertainment and telephony audio sources. Output control signals vary with both long and short time constants to provide volume control and dynamic range compression. The long time constant elements function to gradually shift volume control, and the short time constant elements function to provide dynamic range compression.

The level comparator 422 looks at a ratio of both levels and generates control signals to maintain a minimum level ratio. An implementation of the minimum level ratio includes frequency weighted components and varies based on the actual audio sources present in the system. The output control signals are the gains that are passed back to the entertainment audio chain and telephony audio chain. More particularly, the entertainment audio chain uses the entertainment gain 424 to reduce or remove short time peaks in the entertainment audio to benefit the driver or passenger participating in the telephone call. Similarly, the telephony audio chain uses the telephony gain 426 to reduce or remove short time peaks in the telephony audio.

Particular implementations described herein may take the form of an entirely hardware implementation, an entirely software implementation or an implementation containing both hardware and software elements. In a particular implementation, the disclosed methods are implemented in software that is embedded in processor readable storage medium and executed by a processor, which includes but is not limited to firmware, resident software, microcode, etc.

Further, implementations of the present disclosure, such as the one or more implementations may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various implementations, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed implementations is provided to enable any person skilled in the art to make or use the disclosed implementations. Various modifications to these implementations will be readily apparent to those skilled in the art, and the generic principles defined herein may be applied to other implementations without departing from the scope of the disclosure. Thus, the present disclosure is not intended to be limited to the implementations shown herein but is to be accorded the widest scope possible consistent with the principles and features as defined by the following claims.

What is claimed is:

1. An apparatus comprising: a signal input module configured to receive at least one of an entertainment audio signal and a telephony audio signal from vehicle sound circuitry; a level control module configured to execute gain level control logic to balance the entertainment audio signal and the telephony audio signal according to a ratio, wherein the ratio is based either on a first weighted average of the entertainment audio signal and an upmixed entertainment audio signal; or a second weighted average of the telephony audio signal and an upmixed telephony audio signal; and apply a gain control signal to at least one of the entertainment audio signal and the telephony audio signal; and a routing module configured to mix the entertainment audio signal and the telephony audio signal and route the mixed signal to an output channel associated with a speaker.

2. The apparatus of claim 1, wherein the level control module is further configured to determine the ratio using inputs that include the entertainment audio signal, the telephony audio signal, the upmixed entertainment audio signal, and the upmixed telephony audio signal.

3. The apparatus of claim 1, further comprising an upmixing module configured to upmix at least one of the entertainment audio signal or the telephony audio signal.

4. The apparatus of claim 1, wherein the signal input module is further configured to receive a speech signal originating from a vehicle occupant.

5. The apparatus of claim 1, further comprising an adaptive filter configured to remove unwanted entertainment audio from a speech signal originating from a vehicle occupant.

6. The apparatus of claim 1, further comprising an adaptive filter configured to provide echo cancellation of input signals, wherein the input signals comprise the entertainment audio signal, the telephony audio signal, the upmixed entertainment audio signal, the upmixed telephony audio signal, and a speech signal.

7. The apparatus of claim 1, wherein the speaker is a headrest speaker.

8. The apparatus of claim 1, wherein the level control module is further configured to determine the first weighted average of the entertainment audio signal and the upmixed entertainment audio signal to generate an entertainment reference signal.

9. The apparatus of claim 1, wherein the level control module is further configured to determine the weighted average of the telephony audio signal and the upmixed telephony audio signal to generate a telephony reference signal.

10. The apparatus of claim 9, further comprising a speech detector module configured to update the telephony reference signal in response to detecting a speech signal originating from a vehicle occupant.

11. The apparatus of claim 1, wherein the level control module is further configured to apply frequency weighting to at least one of an entertainment reference signal and a telephony reference signal to generate the gain control signal.

12. The apparatus of claim 1, wherein the routing module is further configured to combine the entertainment audio signal and the telephony audio signal.

13. An apparatus comprising: a memory storing gain level control logic; and a controller configured to; access the memory; and to execute the gain level control logic to balance an entertainment audio signal and a telephony audio signal according to a ratio, wherein the ratio is based either on a first weighted average of the entertainment audio signal and an upmixed entertainment audio signal; or a second weighted average of the telephony audio signal and an upmixed telephony audio signal; and apply a gain control signal to at least one of the entertainment audio signal and the telephony audio signal, and mixing the entertainment audio signal and the telephony audio signal and route the mixed signal to an output channel associated with a speaker.

14. The apparatus of claim 13, wherein the controller is further configured to mix the entertainment audio signal and the telephony audio signal and to route the mixed signal to an output channel associated with a headrest speaker.

15. The apparatus of claim 13, wherein the controller is further configured to determine the ratio using inputs that include the entertainment audio signal, the telephony audio signal, the upmixed entertainment audio signal, and the upmixed telephony audio signal.

16. The apparatus of claim 13, wherein the controller is further configured to determine the weighted average of the entertainment audio signal and the upmixed entertainment audio signal to generate an entertainment reference signal.

17. The apparatus of claim 13, wherein the controller is further configured to determine the weighted average of the telephony audio signal and the upmixed telephony audio signal to generate a telephony reference signal.

18. A method of audio management, the method comprising: receiving an entertainment audio signal and a telephony audio signal; generating a gain control signal using gain level control logic configured to balance the entertainment audio signal and the telephony audio signal according to a ratio, wherein the ratio is based either on a first weighted average of the entertainment audio signal and an upmixed entertainment audio signal or a second weighted average of the telephony audio signal and an upmixed telephony audio signal; applying the gain control signal to at least one of the entertainment audio signal and the telephony audio signal; and combining the entertainment audio signal and the telephony audio signal and routing the combined signal to an output channel associated with a speaker.

19. The method of claim 18, further comprising upmixing signal components of at least one of the entertainment audio signal or the telephony audio signal by separating the at least one of the entertainment audio signal or the telephony audio signal into a number of signals; and routing the output channel to a headrest speaker.

20. The method of claim 18, further comprising determining the ratio using inputs that include the entertainment audio signal, the telephony audio signal, the upmixed entertainment audio signal, and the upmixed telephony audio signal.

* * * * *